United States Patent
O'Gwynn et al.

(10) Patent No.: US 9,885,799 B1
(45) Date of Patent: Feb. 6, 2018

(54) VEHICLE DETECTION LOOP AND LOOP DETERIORATION ASSESSMENT

(71) Applicant: HM ELECTRONICS, INC., Poway, CA (US)

(72) Inventors: David O'Gwynn, Ramona, CA (US); Shane Robert Petcavich, Oceanside, CA (US)

(73) Assignee: HM Electronics, Inc., Poway, CA (US)

( * ) Notice: Subject to any disclaimer, the term of this patent is extended or adjusted under 35 U.S.C. 154(b) by 0 days.

(21) Appl. No.: 15/219,131

(22) Filed: Jul. 25, 2016

(51) Int. Cl.
G01V 3/10 (2006.01)
G01D 5/20 (2006.01)

(52) U.S. Cl.
CPC .......... *G01V 3/101* (2013.01); *G01D 5/2006* (2013.01)

(58) Field of Classification Search
CPC ...... G01V 3/101; G01D 5/2006; G01R 31/28; G08G 1/042
USPC .......... 324/207.15, 505, 529, 534, 546, 547; 340/941
See application file for complete search history.

(56) References Cited

U.S. PATENT DOCUMENTS

| | | | |
|---|---|---|---|
| 4,595,877 A | 6/1986 | Dulk | |
| 4,968,979 A * | 11/1990 | Mizuno | G08G 1/042 340/933 |
| 5,337,004 A * | 8/1994 | Murakami | G01R 31/304 324/520 |
| 6,100,820 A * | 8/2000 | Pieverling | G01V 3/102 340/934 |
| 7,109,887 B2 | 9/2006 | Lu | |
| 7,362,096 B2 * | 4/2008 | Oberdier | G01D 3/036 324/209 |
| 2005/0182597 A1 | 8/2005 | Hilliard | |

OTHER PUBLICATIONS

Maxim Integrated Products; "Snubber Circuits Supress Voltage Transient Spikes in Multiple Output DC-DC Flyback Converter Power Supplies"; Pub. Date Nov. 12, 2001; Tutorial 848; pp. 1-3.*

* cited by examiner

Primary Examiner — Melissa Koval
Assistant Examiner — Rahul Maini
(74) Attorney, Agent, or Firm — Sheppard Mullin Richter & Hampton LLP

(57) ABSTRACT

Systems and methods for vehicle detection and assessments of loop deterioration rely on changes in inductance of a loop sensor. The conductive element of the loop sensor is modeled using one or more inductances and one or more resistances. Sets of stimuli at different frequencies are provided to the loop sensor, and the resulting responses form the basis for vehicle detection and for an assessment whether the loop sensor has deteriorated.

17 Claims, 5 Drawing Sheets

VEHICLE DETECTION LOOP AND LOOP DETERIORATION ASSESSMENT

FIELD OF THE DISCLOSURE

This disclosure relates to systems and methods for vehicle detection based on changes in inductance of a loop sensor, and, in particular, on assessing whether the loop sensor has deteriorated.

BACKGROUND

Vehicle detection based on loop sensors is common. The principles and applications of inductance are well known. Typically, a loop sensor is installed into the surface of a road and arranged to generate a signal that reflects whether a vehicle is present.

SUMMARY

One aspect of the disclosure relates to a system configured for vehicle detection and assessing loop deterioration of a loop sensor. In some implementations, the system may include one or more sensors, one or more power sources, electronic storage, one or more physical processors, external resources, and/or other components. The one or more physical processors may be configured by machine-readable instructions, e.g. to provide information-processing capabilities and/or execute computer program components. In some implementations, similar functionality may be performed by hardwired components, analog components, and/or combinations thereof. In some implementations, the system may include one or more analog-to-digital converters and/or digital-to-analog converters. Executing the machine-readable instructions may cause the one or more physical processors to assist in vehicle detection and assessment of loop deterioration. The machine-readable instructions may include one or more of an impedance component, an analysis component, a detection component, an assessment component, a notification component, a user interface component, and/or other components.

Individual sensors may be configured to generate output signals conveying information. The information may include resistance, inductance, electrical characteristics, visual information, motion-related information, position-related information, and/or other information. In some implementations, the system may determine one or more parameters that are measured, derived, estimated, approximated, and/or otherwise determined based on one or more output signals generated by one or more sensors. In some implementations, the system may be configured to process data that conveys information pertaining to operation of one or more sensors.

The sensors may include, by way of non-limiting example, one or more of a loop sensor, a proximity sensor, a magnetometer, a pressure sensor (e.g. a static pressure sensor, a dynamic pressure sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, degree-of-freedom sensors (e.g. 6-DOF and/or 9-DOF sensors), a compass, and/or other sensors. As used herein, the term "motion sensor" may include one or more sensors configured to generate output conveying information related to position, location, motion, movement, acceleration, and/or other motion-based parameters. Output signals generated by individual sensors (and/or information based thereon) may be stored and/or transferred in electronic files. For example, output signals generated by a motion sensor may be stored on electronic storage media in a sensor file. For example, output signals generated by a loop sensor may be streamed (and/or otherwise transferred) to another component of the system for further processing and/or analysis. As used herein, the term "file" may refer to information organized and/or grouped in electronic format for any period of time.

The loop sensor may include a conductive element arranged in a loop. The conductive element may include wire and/or other conductive elements capable of being arranged in a loop. The loop sensor may be configured to generate output signals conveying changes in inductance of the conductive element. In some implementations, the loop sensor may include an isolation transformer configured to protect one or more components of the system from power surges. The loop sensor may be configured and arranged such that one or more stimuli can be applied and/or provided to the loop sensor. The loop sensor may be configured to produce a response to individual stimuli. For example, a stimulus may include a particular predetermined current, responsive to which the loop sensor may produce a particular response, e.g. a particular (change in) voltage. Alternatively, and/or simultaneously, a stimulus may include a particular predetermined voltage, responsive to which the loop sensor may produce a particular response, e.g. a particular (change in) current. Combinations and variations of different stimuli and different responses are contemplated within the scope of this disclosure.

The one or more power sources may be configured to generate stimuli that are applied and/or provided to other components in the system, including but not limited to the loop sensor. In some implementations, multiple stimuli may form a group or set of stimuli. In some implementations, the one or more power sources may include one or more current sources, one or more voltage sources, one or more energy sources, and/or other power sources. In some implementations, individual stimuli may include changes occurring at one or more frequencies. For example, in some implementations, an individual stimulus may include an alternating current having a particular predetermined frequency. For example, such an individual stimulus may be applied and/or provided for a particular and/or predetermined period. In some implementations, groups or sets of stimuli may include stimuli having different frequencies. In some implementations, groups or sets of stimuli may include stimuli having similar frequencies. In some implementations, an individual stimulus may include changes occurring at multiple frequencies, e.g. a chirp. In some implementations, the one or more power sources may be configured to obtain (instructions for) stimuli from another component in the system, including but not limited through a user interface configured to receive instructions from a user. As used herein, the term "obtain" (and derivatives thereof) may include active or passive retrieval, receipt, determination, derivation, transfer, upload, download, submission, or exchange of information, or any combination of these actions.

The system may be configured to determine parameters based on output signals from sensors. For example, the system may be configured to determine position, location, motion, movement, acceleration, and/or other parameters based on output generated by a motion sensor. As used herein, the term "determine" (and derivatives thereof) may include measure, calculate, compute, estimate, approximate, generate, or otherwise derive, and may include any combination thereof.

The impedance component may be configured to determine impedances of the loop sensor and/or the conductive element, e.g. based on generated output signals. Determinations by the impedance component may be made responsive to stimuli, e.g. in response to application and/or provision of one or more stimuli to the loop sensor and/or the conductive element. In some implementations, the impedance component may be configured to determine a set of impedances such that an individual impedance corresponds to an individual stimulus. In some implementations, determinations by the impedance component may be made during and/or immediately after application and/or provision of one or more stimuli.

The analysis component may be configured to determine model parameters for a model of the loop sensor. Determinations by the analysis component may be based on one or more impedances, e.g. as determined by the impedance component. In some implementations, model parameters may include one or more model inductances, one or more model resistances, and/or other electrical characteristics of a circuit arrangement that represents at least some behavior of the loop sensor. For example, a model of a loop sensor may include a model inductance, a model parallel loss (which is a type of resistance), a model series resistance, and/or other model parameters. In some implementations, a model of a loop sensor may include multiple model inductances. For example, a model of a loop sensor may include frequencies-specific model inductances. For example, a frequency-specific model inductance may correspond to a frequency-specific stimulus. In some implementations, a model of a loop sensor may include one or more aggregations of multiple model inductances. For example, a first aggregate model inductance may be an aggregation of at least two frequency-specific model inductances. For example, a second aggregate model inductance may be an aggregation of more than two frequency-specific model inductances.

The detection component may be configured to detect whether a vehicle is proximate to the loop sensor. In some implementations, detections by the detection component may be based on determined model parameters that represent the loop sensor, including but not limited to one or more model inductances and/or one or more model resistances. In some implementations, detections may be based on comparisons of model parameters with thresholds. In some implementations, the detection component may be configured to adjust a threshold and/or select among multiple thresholds based on a concurrent and/or previously-made determination or detection by the system. For example, responsive to a recent and/or previous set of stimuli resulting in responses that indicate the presence and/or proximity of a vehicle, the detection component may be configured to adjust a threshold and/or select among multiple thresholds in order to detect whether the vehicle continues to be present and/or proximate.

The assessment component may be configured to assess whether the loop sensor has deteriorated. In some implementations, assessments by the assessment component may be based on determined model parameters that represent the loop sensor, including but not limited to one or more model inductances and/or one or more model resistances. In some implementations, assessments may be based on comparisons of model parameters with thresholds. In some implementations, the assessment component may be configured to adjust a threshold and/or select among multiple thresholds based on a concurrent and/or previously-made determination or detection or assessment by the system. For example, responsive to a recent and/or previous set of stimuli resulting in responses that indicate the presence and/or proximity of a vehicle, the assessment component may be configured to adjust a threshold and/or select among multiple thresholds in order to assess the current quality and/or condition of the loop sensor.

The notification component may be configured to notify users, e.g. regarding vehicle detection, loop deterioration, and/or other operations and/or determinations by the system. In some implementations, notifications may include a message that is displayed to a user, e.g. through a user interface and/or a display component. In some implementations, notifications may be transmitted to a user, e.g. through electronic messaging.

The user interface component may be configured to generate and/or present user interfaces to users. User interfaces may be configured to facilitate interaction between the system and one or more users. In some implementations, presentation of user interfaces may be effectuated at computing platforms, including but not limited to client computing platforms. In some implementations, the user interface component may be configured to receive user input from users. For example, the user interface component may be configured to receive user input from a particular user through a user interface that has been presented to the particular user. In some implementations, the user interface component may be configured to receive user input that corresponds to one or more new commands, instructions, and/or stimuli.

In some implementations, a sensor may be integrated with electronic storage such that captured information may be stored in the integrated embedded storage. For example, a vehicle detector may include one or more loop sensors and electronic storage media. In some implementations, a sensor may be configured to transfer captured information to remote electronic storage media, e.g. through "the cloud."

In some implementations, information pertaining to the operation of a sensor may include information regarding the mode of operation, the quality of the component, the condition of the component, activity of a user interface, buttons pushed, features activated, etc. In some implementations, information pertaining to the operation of a sensor may include meta-data regarding the sensor.

In some implementations, the system may include one or more client computing platforms. For example, client computing platforms may be used to facilitate user interaction. Client computing platforms may include one or more processors configured to execute computer program components. The computer program components may be configured to enable a user associated with a client computing platform to interact with the system, any component thereof, other client computing platforms, and/or provide other functionality attributed herein to client computing platforms. By way of non-limiting example, client computing platforms may include one or more of a desktop computer, a laptop computer, a handheld computer, a NetBook, a mobile telephone, a (smart) phone, a tablet, a (smart) watch, a personal medical device, a mobile computing platform, a gaming console, a television, an electronic device, and/or other computing platforms. Users may communicate using any of the computing platforms described in this disclosure, and/or any combination of computing platforms described in this disclosure.

One aspect of the disclosure relates to methods for vehicle detection and assessing loop deterioration of a loop sensor.

As used herein, any association (or relation, or reflection, or indication, or correspondency) involving sensors, output signals, conductive elements, power sources, frequencies, stimuli, responses, impedances, resistances, inductances, model parameters, aggregations, detections, assessments, notifications, client computing platforms, or another entity or object that interacts with any part of the system or plays a part in the operation of the system, may be a one-to-one association, a one-to-many association, a many-to-one association, or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
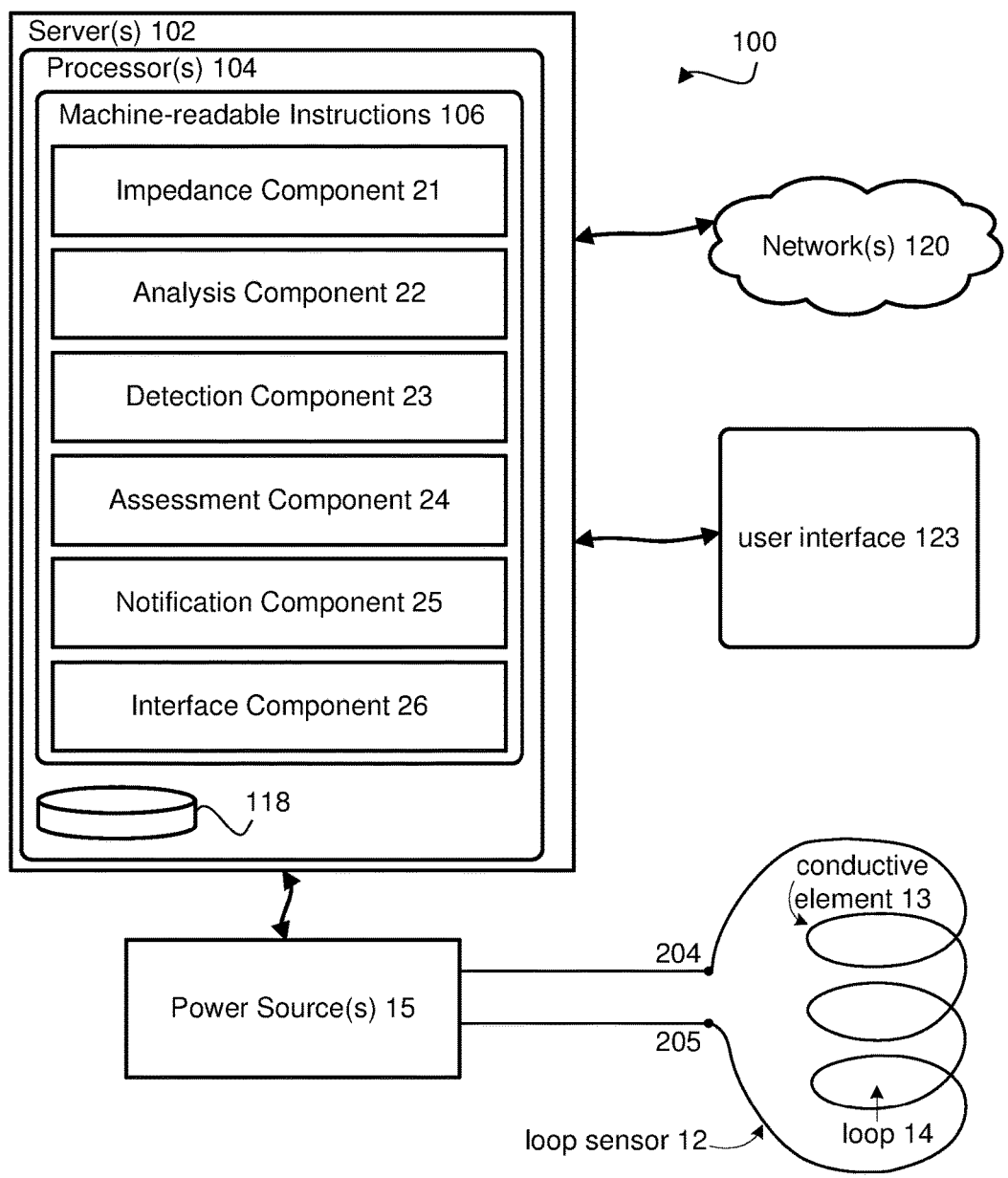
FIG. 1 illustrates a system configured for vehicle detection and assessing loop deterioration of a loop sensor, in accordance with one or more implementations.

FIG. 1 illustrates a system 100 configured for vehicle detection and assessing loop deterioration of a loop sensor 12. Applications for vehicle detection may include, by way of non-limiting example, drive-through lanes, parking lots, traffic-related applications, vehicle profiling, vehicle classification, and/or other applications.

System 100 may include one or more sensors 12, one or more power sources 15, electronic storage 118, one or more servers 102, one or more physical processors 104, one or more user interfaces 123, and/or other components. Components of system 100 may be connected via conductive elements, conductive connectors, and/or one or more networks 120, for example communications networks. In some implementations, system 100 may not include any servers.

Figure 6:
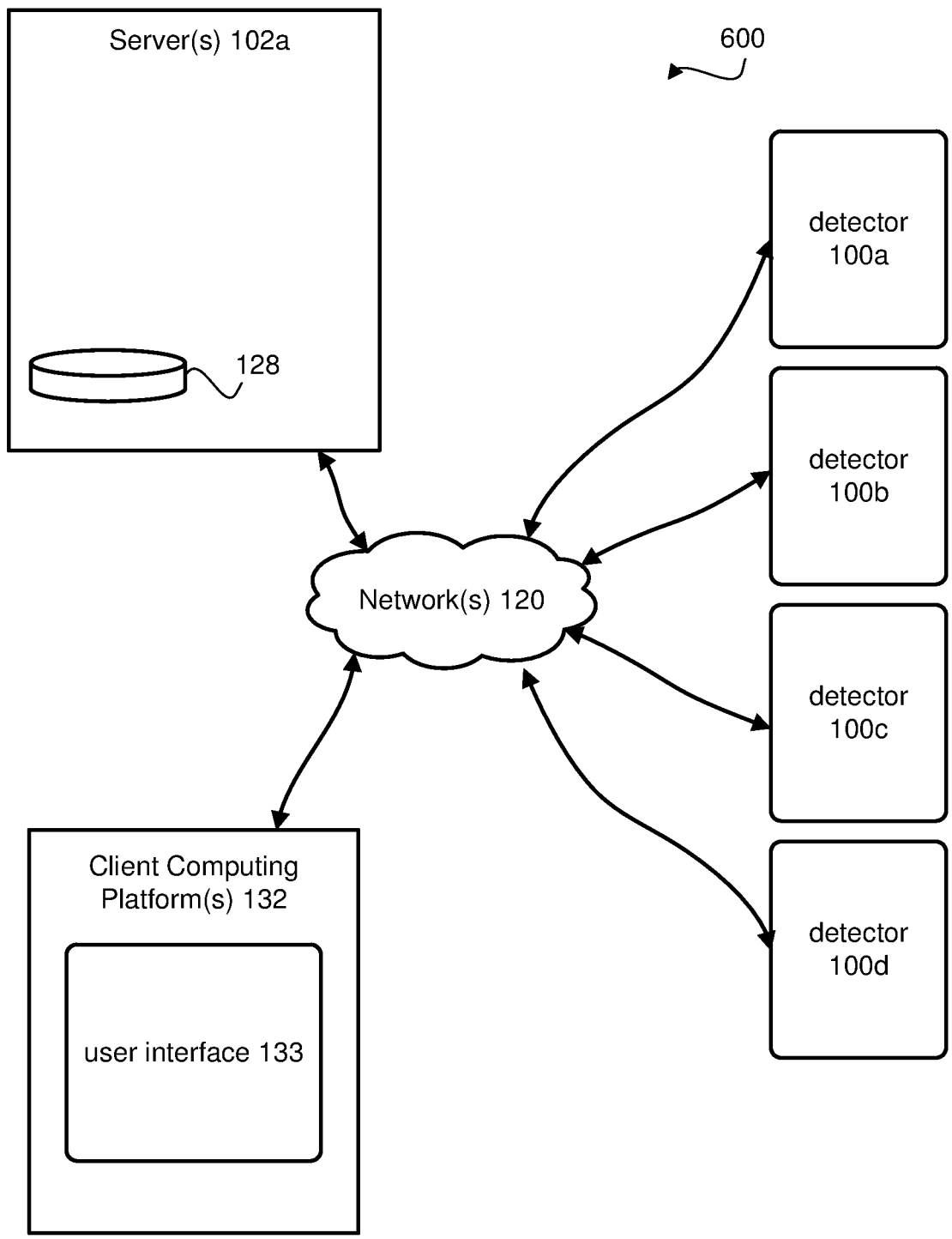
FIG. 6 illustrates a system configured for vehicle detection and assessing loop deterioration of a loop sensor, in accordance with one or more implementations.

In some implementations, system 100 may include and/or be electronically coupled to one or more client computing platforms (e.g., as shown in FIG. 6).

By virtue of the systems and methods described herein sets of stimuli including but not limited to frequency-specific bursts of alternating current may be provided to loop sensor 12. In response, a set of frequency-specific responses may be measured from which electrical characteristics such as loop inductance may be determined. By comparing changes in electrical characteristics between the provision of different sets of stimuli, system 100 may be configured to detect a vehicle and/or assess whether loop sensor 12 has deteriorated, e.g. in its ability and/or quality of detecting vehicles. Alternatively, and/or simultaneously, system 100 may be configured to detect metal and/or eddy currents.

Server 102 may include one or more physical processors 104 configured by machine-readable instructions 106 and/or other components. Executing the machine-readable instructions 106 may cause the one or more physical processors 104 to facilitate vehicle detection and assessment of deterioration of a loop sensor. The machine-readable instructions 106 may include one or more of an impedance component 21, an analysis component 22, a detection component 23, an assessment component 24, a notification component 25, a user interface component 26, and/or other components. In some implementations, part or all of the functionality attributed to these components may be performed by hardwired components, analog components, and/or combinations thereof.

At least some of the components of system 100 may be physically separate and/or remote from one another. For example, a user interface may be physically separate and/or remote from a loop sensor. In some implementations, system 100 may include one or more client computing platforms 132 (as shown in FIG. 6). Client computing platform 132 may include mobile client computing platforms such as, by way of non-limiting example, a (smart) watch, a (smart) phone, and/or a personal electronic device.

Referring to FIG. 1, sensors 12 may be configured to generate output signals. In some implementations, sensors 12 may include one or more cameras and/or image sensors. Electronic storage 118 may be configured to store information electronically. One or more physical processors 104 may be configured to provide information-processing capabilities and/or execute computer program components, including but not limited to impedance component 21, analysis component 22, detection component 23, assessment component 24, notification component 25, user interface component 26, and/or other components.

Individual sensors 12 may be configured to generate output signals conveying information. The information may include resistance, inductance, electrical characteristics, visual information, motion-related information, position-related information, biometric information, and/or other information. In some implementations, system 100 may determine one or more parameters that are measured, derived, estimated, approximated, and/or otherwise determined based on one or more output signals generated by one or more sensors 12. In some implementations, system 100 may be configured to process data that conveys information pertaining to operation of one or more sensors 12.

Sensors 12 may include, by way of non-limiting example, one or more of a loop sensor 12 and/or other sensors. Output signals generated by individual sensors 12 (and/or information based thereon) may be stored and/or transferred in electronic files.

Loop sensor 12 may include a conductive element 13 arranged in a loop 14. Conductive element 13 may include wire and/or other conductive elements capable of being arranged in a shape similar to a loop. Conductive element 13 and/or loop sensor 12 may have electrical characteristics by virtue of being arranged in loop 14. In particular, by way of non-limiting example, conductive element 13 may have a loop inductance. Loop sensor 12 may be configured to generate output signals conveying changes in inductance of conductive element 13. In some implementations, loop sensor 12 may include electrical leads 204 and 205 configured to connect one or more components to loop sensor 12. For example, power source 15 may provide stimuli to loop sensor 12 through electrical leads 204 and/or 205. Loop sensor 12 may be configured and arranged such that one or more stimuli can be applied and/or provided to loop sensor 12, e.g. through electrical leads 204 and/or 205. Loop sensor 12 may be configured to produce a response to individual stimuli. For example, a stimulus may include a particular predetermined current, responsive to which loop sensor 12 may produce a particular response, e.g. a particular (change in) voltage. Alternatively, and/or simultaneously, a stimulus may include a particular predetermined voltage, responsive to which loop sensor 12 may produce a particular response, e.g. a particular (change in) current. Combinations and variations of different stimuli and different responses are contemplated within the scope of this disclosure.

Referring to FIG. 1, one or more power sources 15 may be configured to generate stimuli that are applied and/or provided to other components in system 100, including but not limited to loop sensor 12. In some implementations, multiple stimuli may form a group or set of stimuli. In some implementations, one or more power sources 15 may include one or more current sources, one or more voltage sources, one or more energy sources, and/or other power sources. In some implementations, individual stimuli may include changes occurring at one or more frequencies. For example, in some implementations, an individual stimulus may include an alternating current having a particular predetermined frequency. For example, such an individual stimulus may be applied and/or provided for a particular and/or predetermined period. In some implementations, groups or sets of stimuli may include stimuli having different frequencies. In some implementations, groups or sets of stimuli may include stimuli having similar frequencies. In some implementations, an individual stimulus may include changes occurring at multiple frequencies, e.g. a chirp. In some implementations, one or more power sources 15 may be configured to obtain (instructions for) stimuli from another component in system 100, including but not limited through a user interface configured to receive instructions from a user.

By way of non-limiting example, in some implementations, one or more power sources 15 may be configured to generate a current that is dependent on a voltage delivered to the power source from a digital-to-analog converter (DAC). The DAC may be configured to be controlled through instructions, e.g. from a digital signal processor (DSP).

System 100 may be configured to determine parameters based on output signals from sensors 12. For example, system 100 may be configured to determine electrical characteristics, and/or changes thereof, of conductive element 13 and/or loop sensor 12. In some implementations, vehicle detection may be based on detecting changes in electrical characteristics. In some implementations, assessments pertaining to loop deterioration of loop sensor 12 may be based on the electrical characteristics, and/or changes thereof, of conductive element 13 and/or loop sensor 12.

Figure 2:
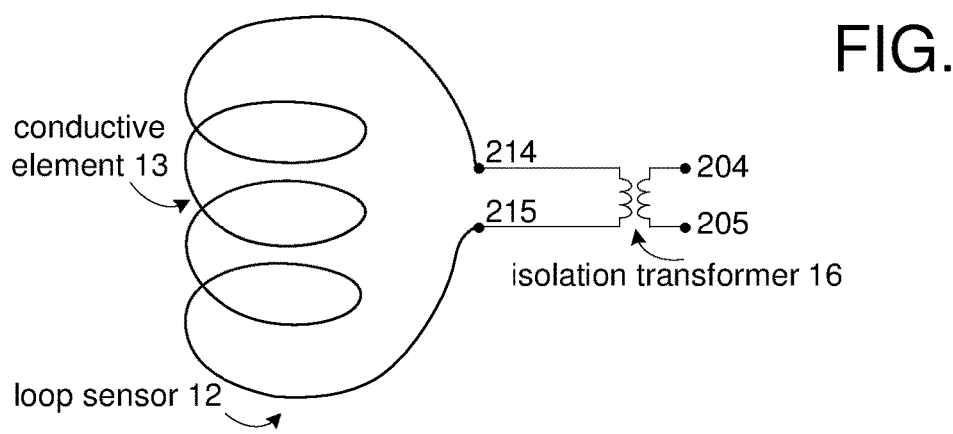
FIG. 2 illustrates a loop sensor.

In some implementations, loop sensor 12 may include an isolation transformer 16 (shown in FIG. 2) configured to protect one or more components of system 100 from power surges. In some implementations, loop sensor 12 may include additional electrical leads 214 and 215. Electrical leads 214 and 215 may be arranged such that isolation transformer 16 is connected to conductive element 13 through electrical leads 214 and 215, as depicted in FIG. 2.

Figure 3:
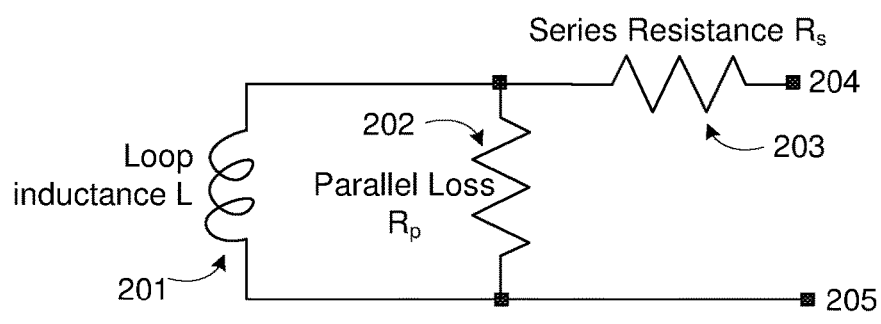
FIG. 3 illustrates a model of a loop sensor.

As illustrated in FIG. 3, a model 200 of a loop equivalent circuit may represent the electrical characteristics of loop sensor 12. In some implementations, model 200 may include one or more model inductances, one or more model resistances, and/or other model parameters. For example, model 200 may be characterized by a loop inductance L (or model inductance L), a series resistance $R_s$, a parallel loss $R_P$, and/or other model parameters that are arranged in the loop equivalent circuit depicted in FIG. 3. For example, parallel loss $R_p$ may be a resistance that is arranged in parallel to model inductance L. For example, series resistance $R_s$ may be a resistance that is arranged in series to model inductance L.

In some implementations, an individual stimulus from a set of stimuli may include an alternating current having a particular predetermined frequency f. The impedance for the loop equivalent circuit represented by model 200 as a function of the frequency f of a stimulus (with w=2πf) may be expressed using the following formula:

$$Z(\omega) = R_s + \frac{R_p j\omega L}{R_p + j\omega L}$$

In some implementations, individual impedances as measured at particular frequencies may correspond to individual values of one or more model parameters, including but not limited to loop inductances. For example, a set of stimuli at different frequencies may correspond to a set of loop inductances derived from a set of corresponding impedances.

In some implementations, using direct currents may not be desirable. By way of non-limiting example, in some implementations, an individual stimulus may include single-frequency sine wave bursts. Different stimuli in a set of stimuli may include sine wave bursts having different frequencies. Individual stimuli may correspond to individual responses and/or measurements at a particular frequency, which may correspond to individual impedances in accordance with the preceding formula. By way of non-limiting example, in some implementations, a set of stimuli may range between about 12 kHz and about 75 kHz, with subsequent stimuli being 3 kHz apart. By way of non-limiting example, such a set may include 22 stimuli, or another number of stimuli. Other numbers of stimuli per set of stimuli are envisioned within the scope of this disclosure.

In some implementations, using alternating currents having frequencies exceeding 1 MHz may not be desirable. In some implementations, using alternating currents having frequencies below 10 kHz may not be desirable, in particular if loop sensor 12 includes isolation transformer 16. In some implementations, the value of $R_s$ may be calculated from a single measurement at the lowest frequency in a set of stimuli, if $R_s$ is less than about 15 Ohms, and $R_s$ is not particularly sensitive to the values of $R_p$ and L. In some implementations, L is in the range of about 120 µH±50%. $R_s$ may be determined and/or approximated using the following formula for the real part of the impedance, with $R_T$ being the total series resistance of the transformer primary and secondary:

$$Z_{re} = R_s + \frac{\omega^2 L^2 R_p}{R_p^2 + \omega^2 L^2} + R_T$$

Impedance component 21 may be configured to determine impedances of the loop sensor and/or the conductive element, e.g. based on generated output signals. Determinations by impedance component 21 may be made responsive to stimuli, e.g. in response to application and/or provision of one or more stimuli to conductive element 13 and/or loop sensor 12. In some implementations, impedance component 21 may be configured to determine a set of impedances such that an individual impedance corresponds to an individual stimulus. In some implementations, determinations by impedance component 21 may be made during and/or immediately after application and/or provision of one or more stimuli. Measurements and/or determinations by impedance component 21 may be in accordance with any of the formulas within this disclosure.

Analysis component 22 may be configured to determine model parameters for a model of loop sensor 12. Determinations by analysis component 22 may be based on one or more impedances, e.g. as determined by impedance component 21. In some implementations, model parameters may include one or more model inductances, one or more model resistances, and/or other electrical characteristics of a circuit arrangement that represents at least some behavior of loop sensor 12. For example, a model of a loop sensor may include a model inductance, a model parallel loss (which is a type of resistance), a model series resistance, and/or other model parameters. In some implementations, a model of a loop sensor may include multiple model inductances. For example, a model of a loop sensor may include frequency-specific model inductances. For example, a frequency-specific model inductance may correspond to a frequency-specific stimulus. Measurements and/or determinations by analysis component 22 may be in accordance with any of the formulas within this disclosure, including but not limited to the determination of $R_s$ as described above.

Analysis component 22 may be configured to determine $R_p$ via the following formulas:

$$Z_{re} - R_s = \frac{R_p \omega^2 L^2}{R_p^2 + \omega^2 L^2},$$

with $R_c = Z_{re} - R_s$, solving for $R_P$:

$$R_p = \frac{\omega^2 L^2 + \sqrt{\omega^4 L^4 - 4\omega^2 L^2 R_c^2}}{2R_c},$$

$\omega^4 L^4 - 4\omega^2 L^2 R_c^2 \geq 0$ and $R_c \neq 0$

In some implementations, a model of a loop sensor may include one or more aggregations of multiple model inductances. For example, a first aggregate model inductance may be an aggregation of at least two frequency-specific model inductances. This first aggregation may represent a loop inductance that may be used for vehicle detection. In some implementations, the first aggregation may be based on a subset of the set of frequency-specific model inductances that correspond to the set of stimuli.

In some implementations, a second aggregate model inductance may be an aggregation of more than two frequency-specific model inductances. This second aggregation may represent a loop inductance that may be used for assessing whether the loop sensor has deteriorated. In some implementations, the second aggregation may be based on a subset and/or the entire set of frequency-specific model inductances that correspond to the set of stimuli.

Detection component 23 may be configured to detect whether a vehicle is proximate to loop sensor 12. In some implementations, detections by detection component 23 may be based on determined model parameters that represent loop sensor 12, including but not limited to one or more model inductances and/or one or more model resistances. In some implementations, vehicle detection may be based on a single frequency-specific model inductance. In some implementations, vehicle detection may be based on a particular aggregation of at least two frequency-specific model inductances. In some implementations, detections may be based on one or more comparisons of determined model parameters at different moments in time. In some implementations, detections may be based on one or more comparisons of determined model parameters corresponding to a previous set of stimuli. In some implementations, detections may be based on comparisons of model parameters with thresholds. As used herein, the term "threshold" may include thresholds using absolute values, percentage values (of a previously determined amount or magnitude), and/or any combinations thereof. In some implementations, detection component 23 may be configured to adjust a threshold and/or select among multiple thresholds based on a concurrent and/or previously-made determination or detection by system 100. For example, responsive to a recent and/or previous set of stimuli resulting in responses that indicate the presence and/or proximity of a vehicle, detection component 23 may be configured to adjust a threshold and/or select among multiple thresholds in order to detect whether the vehicle continues to be present and/or proximate.

Assessment component 24 may be configured to assess whether loop sensor 12 has deteriorated. In some implementations, assessments by assessment component 24 may be based on determined model parameters that represent loop sensor 12, including but not limited to one or more model inductances and/or one or more model resistances. In some implementations, assessments whether loop sensor 12 has deteriorated may be based on an aggregation of more than two frequency-specific model inductances. In some implementations, assessments may be based on one or more comparisons of determined model parameters at different moments in time. In some implementations, assessments may be based on one or more comparisons of determined model parameters corresponding to a previous set of stimuli. In some implementations, assessments may be based on comparisons of model parameters with thresholds, including but not limited to baseline measurements of system 100. In some implementations, assessment component 24 may be configured to adjust a threshold and/or select among multiple thresholds based on a concurrent and/or previously-made determination or detection or assessment by system 100. For example, responsive to a recent and/or previous set of stimuli resulting in responses that indicate whether the loop sensor 12 has deteriorated, assessment component 24 may be configured to adjust a threshold and/or select among multiple thresholds in order to assess the current quality and/or condition of loop sensor 12.

Alternatively, and/or simultaneously, assessments by assessment component 24 may be based on absolute values for one or more model parameters and/or combinations of relative comparisons (between previously-made determinations, detections, and/or assessments) and absolute comparisons with absolute values.

In some implementations, operations by detection component 23 and assessment component 24 may operate in conjunction. For example, a change in the measured loop inductance may indicate that a vehicle is detected or that the loop sensor has deteriorated. System 100 may be configured to analyze whether the change in $R_p$ (also referred to as $\Delta R_P$) is indicative of vehicle detection or loop sensor deterioration. In some implementations, system 100 may be configured to compare the change in $R_p$ to a threshold that indicates a limit to how much $R_p$ can change before a change in inductance causes system 100 to detect a vehicle.

Notification component 25 may be configured to notify users, e.g. regarding vehicle detection, loop deterioration, and/or other operations and/or determinations by system 100. In some implementations, notifications may include a message that is displayed to a user, e.g. through a user interface 123 and/or a display component. In some implementations, notifications may be transmitted to a user, e.g. through electronic messaging.

User interface component 26 may be configured to generate and/or present user interfaces to users. In some implementations, such a user interface may be in proximity of the loop sensor (e.g. sensor 12), as shown in FIG. 1 by user interface 123. In some implementations, such a user interface may be physically separate and/or remote from the loop sensor (e.g. sensor 12), as shown in FIG. 6 by user interface 133 that is included in client computing platform 132.

FIG. 6 illustrates a system 600 configured for vehicle detection and assessing loop deterioration of loop sensors. System 600 may include one or more servers 102a, one or more client computing platforms 132, one or more detectors (e.g., a detector 100a, a detector 100b, a detector 100c, and a detector 100d), and/or other components. In some implementations, the one or more servers 102a may include the same or similar structure and/or functionality as the one or more servers 102 shown in FIG. 1. For example, the one or more servers 102a may include one or more physical processors configured by machine-readable instructions and/or other components, similar to the one or more servers 102 shown in FIG. 1. For example, execution of the machine-readable instructions may cause the one or more servers 102a to facilitate vehicle detection and assessment of deterioration of a loop sensor as described in this disclosure, including but not limited to all or part of the functionality attributed to computer program components including an impedance component, an analysis component, a detection component, an assessment component, a notification component, and/or a user interface component.

In some implementations, the one or more servers 102a may include different structure and/or functionality as the one or more servers 102 shown in FIG. 1. For example, the one or more servers 102a may include machine-readable instructions that cause the one or more servers 102a to facilitate using multiple detectors to perform vehicle detection and assessment of deterioration of loop sensors.

Components of system 600 may be connected via conductive elements, conductive connectors, and/or one or more networks 120, for example communications networks. Individual ones of the detectors in FIG. 6 (detectors 100a-100d) may include all or more of the components of system 100 shown in FIG. 1. In particular, each of the detectors shown in FIG. 6 may include a loop sensor similar to loop sensor 12, a power source similar to power source 15, and machine-readable instructions similar to machine-readable instructions 106. The number of detectors as shown in FIG. 6 is not intended to be limiting in any way. Individual detectors may be configured to connect, via network 120, to server 102a such that information regarding individual loop sensors may be gathered centrally. In some implementations, individual detectors may be configured to connect, via network 120, to server 102a such that control for individual loop sensors may be performed centrally.

User interfaces 123 and/or 133 may be configured to facilitate interaction between system 100 and one or more users. In some implementations, presentation of a user interface may be effectuated at computing platforms, including but not limited to client computing platform 132 (shown in FIG. 6). In some implementations, user interface component 26 may be configured to receive user input from users. For example, user interface component 26 may be configured to receive user input from a particular user through a user interface that has been presented to the particular user. In some implementations, user interface component 26 may be configured to receive user input that corresponds to one or more new commands, instructions, and/or stimuli.

By way of non-limiting example, one or more features and/or functions attributed to server 102a may be provided at a client-end application that may be installed on client computing platform 132, and/or vice versa. In some implementations, one or more features and/or functions attributed to server 102a may be configured as a cloud-based application that a user may access via client computing platform 132. In some implementations, an application providing one or more features and/or functions attributed herein to server 102a may be configured to be part client-end and part cloud based. Further, it is noted that the one or more client computing platforms, servers, and/or other machines executing a client-based application and/or a cloud-based application may include one or more of one or more processors, electronic storage configured to store and/or execute program code corresponding to the processes described herein, and/or other components.

By way of non-limiting example, individual ones of one or more computing platforms 132 may include machine-readable instructions comprising the same or similar components as machine-readable instructions 106 of server 102a. Client computing platforms 132 may be configured to execute locally the same or similar components of machine-readable instructions 106.

Server 102a, computing platforms 132, and/or other entities may be operatively linked via one or more electronic communication links. For example, such electronic communication links may be established, at least in part, via one or more networks 120. In some implementations, network 120 may include the Internet and/or may employ other communications technologies and/or protocols. By way of non-limiting example, network 120 may employ communication technologies including one or more of Ethernet, 802.11, worldwide interoperability for microwave access (Wi-MAX), 3G, Long Term Evolution (LTE), digital subscriber line (DSL), asynchronous transfer mode (ATM), InfiniBand, PCI Express Advanced Switching, Bluetooth, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which server 102a, computing platforms 132, and/or other entities may be operatively linked via some other communication media.

Server 102 and/or server 102a may include electronic storage. In some implementations, for example, server 102 may include electronic storage 118 as shown in FIG. 1. In some implementations, for example, server 102a may include electronic storage 128 as shown in FIG. 6. Server 102 and/or server 102a may include communication lines or ports to enable the exchange of information with a network and/or other entities. Illustration of Server 102 and/or server 102a as a single component is not intended to be limiting. Server 102 and/or server 102a may include a plurality of hardware, software, and/or firmware components operating together to provide the functionality attributed herein to server 102 and/or server 102a. For example, server 102 and/or server 102a may be implemented by a cloud of computing platforms operating together as server 102 and/or server 102a.

Electronic storage 118 and/or electronic storage 128 may include electronic storage media that electronically stores information. The electronic storage media of electronic storage 118 and/or electronic storage 128 may include one or both of system storage that is provided integrally (i.e., substantially non-removable) with server 102 and/or server 102a and/or removable storage that is removably connectable to server 102 and/or server 102a via, for example, a port or a drive. A port may include a USB port, a FireWire (IEEE 1394) port, and/or other port. A drive may include a disk drive and/or other drive. Electronic storage 118 and/or electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 and/or electronic storage 128 may include one or more virtual storage resources (e.g., cloud storage, a virtual private network, and/or other virtual storage resources). Electronic storage 118 and/or electronic storage 128 may store implementations of software algorithms, information determined by processor(s) 104, information received from server 102 and/or server 102a, information received from computing platforms 132, and/or other information that enables server 102 and/or server 102a to function as described herein.

Processor(s) 104 may be configured to provide information-processing capabilities in server 102 and/or server 102a. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. Processor 104 may be configured to execute components 21-26. Processor 104 may be configured to execute components 21-26 by software; hardware; firmware; some combination of software, hardware, and/or firmware; and/or other mechanisms for configuring processing capabilities on processor 104.

It should be appreciated that although components 21-26 are illustrated in FIG. 1 as being co-located within a single processing unit, in implementations in which processor 104 includes multiple processing units, one or more of components 21-26 may be located remotely from the other components. The description of the functionality provided by the different components 21-26 described above is for illustrative purposes and is not intended to be limiting, as any of components 21-26 may provide more or less functionality than is described. For example, one or more of components 21-26 may be eliminated, and some or all of its functionality may be provided by other ones of components 21-26 and/or other components. As another example, processor 104 may be configured to execute one or more additional components that may perform some or all of the functionality attributed below to one of components 21-26.

Figure 4:
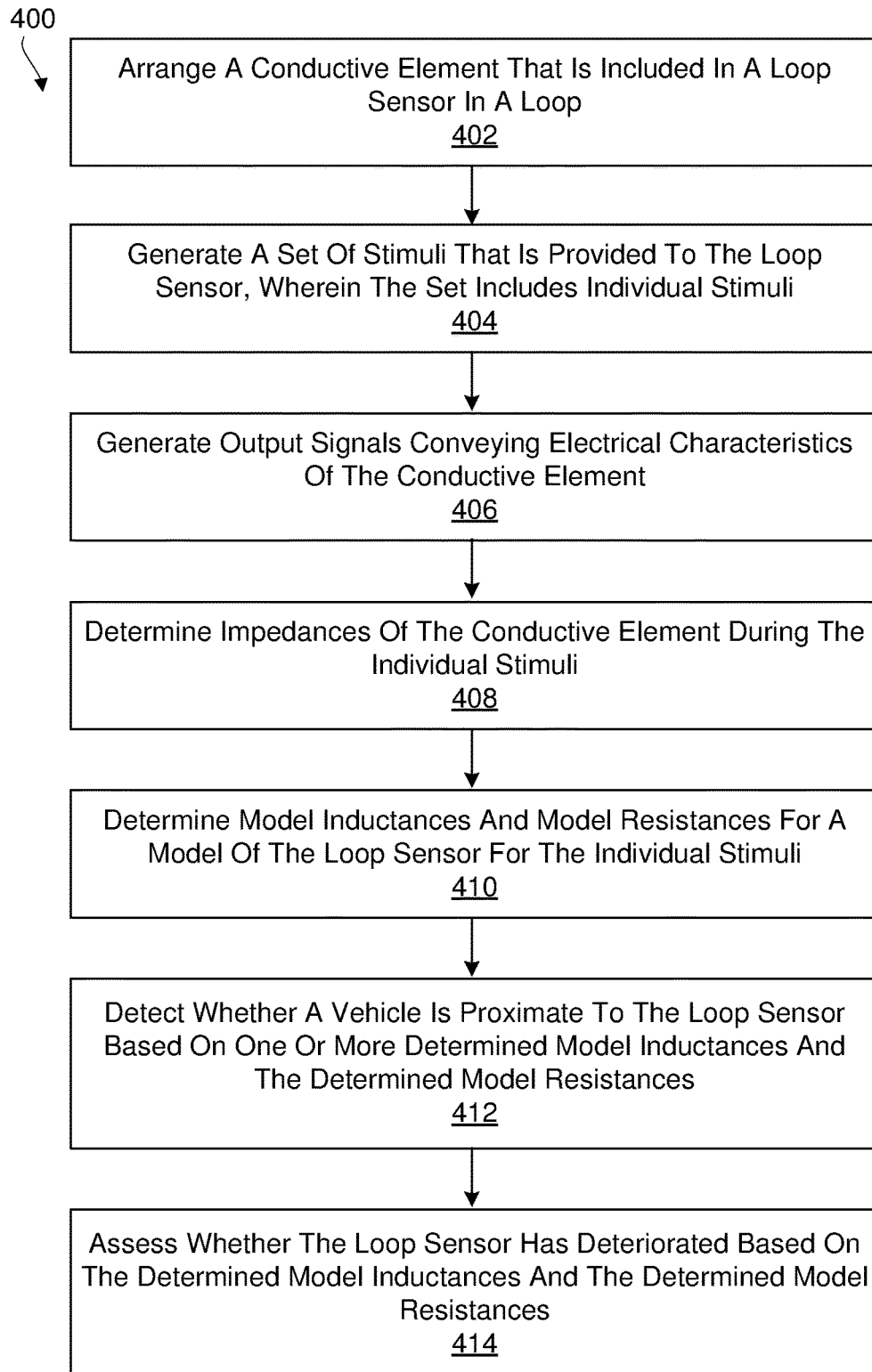
FIGS. 4-5 illustrate methods for vehicle detection and assessing loop deterioration of a loop sensor, in accordance with one or more implementations.

FIG. 4 illustrates a method 400 for vehicle detection and assessment of loop deterioration, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

At an operation 402, a conductive element that is included in a loop sensor is arranged in a loop. In some embodiments, operation 402 is performed by a conductive element the same as or similar to conductive element 13 (shown in FIG. 1 and described herein).

At an operation 404, a set of stimuli is generated that is provided to a loop sensor. The set includes individual stimuli. In some embodiments, operation 404 is performed by a power source the same as or similar to power source 15 (shown in FIG. 1 and described herein).

At an operation 406, output signals are generated conveying electrical characteristics of the conductive element. The output signals may be generated responsive to provision of the set of stimuli. In some embodiments, operation 406 is performed by a loop sensor the same as or similar to loop sensor 12 (shown in FIG. 1 and described herein).

At an operation 408, impedances of the conductive element are determined from the output signals produced responsive to the set of stimuli, during the individual stimuli. In some embodiments, operation 408 is performed by an impedance component the same as or similar to impedance component 21 (shown in FIG. 1 and described herein).

At an operation 410, model inductances and model resistances are determined from the impedances for a model of the loop sensor for the individual stimuli. In some embodiments, operation 410 is performed by an analysis component the same as or similar to analysis component 22 (shown in FIG. 1 and described herein).

At an operation 412, whether a vehicle is proximate to the loop sensor is detected based on one or more of the determined model inductances and the determined model resistances. In some embodiments, operation 412 is performed by a detection component the same as or similar to detection component 23 (shown in FIG. 1 and described herein).

At an operation 414, whether the loop sensor has deteriorated is assessed based on the determined model inductances and the determined model resistances. In some embodiments, operation 414 is performed by an assessment component the same as or similar to assessment component 24 (shown in FIG. 1 and described herein).

Figure 5:
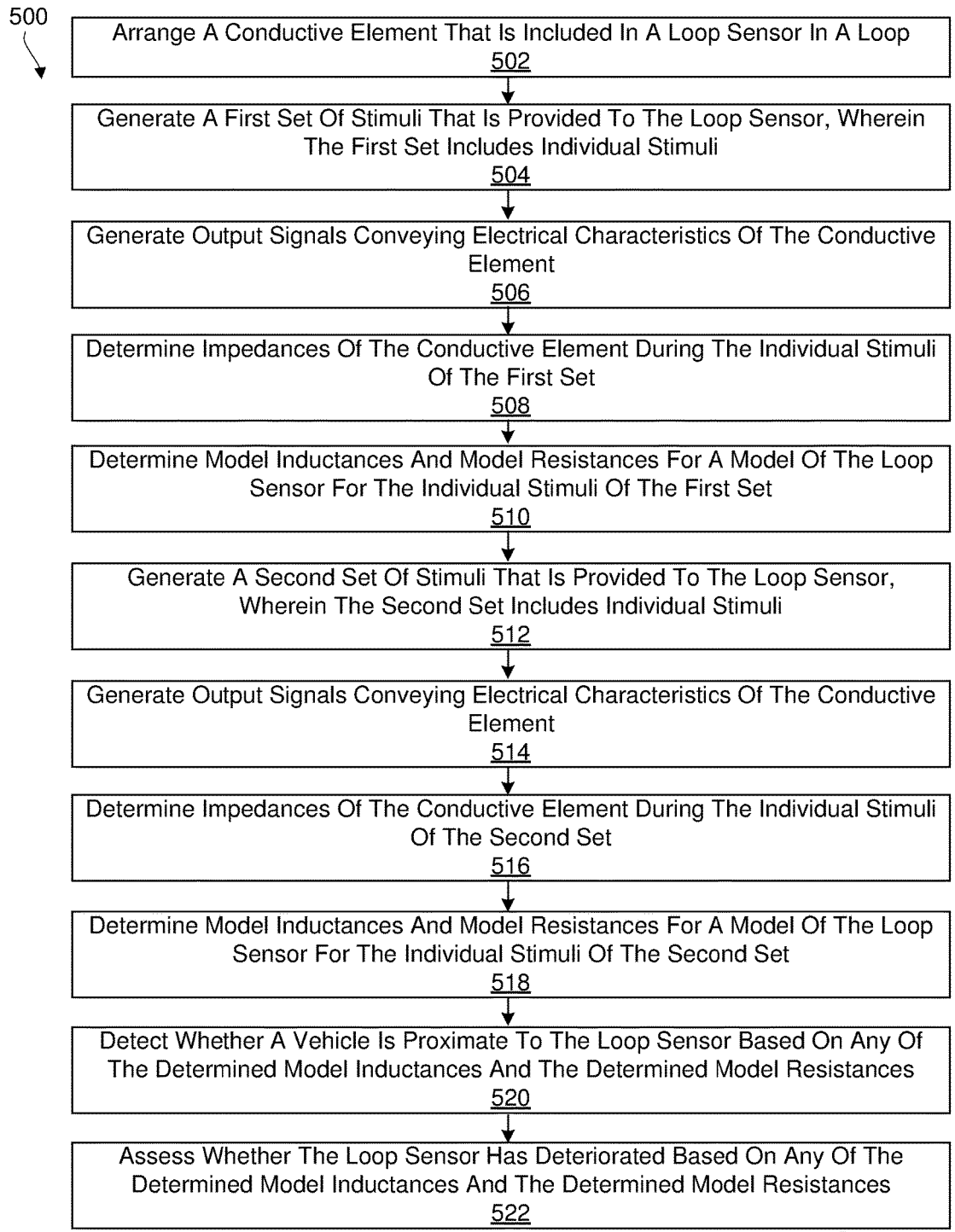

FIG. 5 illustrates a method 500 for vehicle detection and assessment of loop deterioration, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 500 in response to instructions stored electronically on electronic storage medium. The one or more processing devices may include one or more devices configured through hardware, firmware, and/or software to be specifically designed for execution of one or more of the operations of method 500.

At an operation 502, a conductive element that is included in a loop sensor is arranged in a loop. In some embodiments, operation 502 is performed by a conductive element the same as or similar to conductive element 13 (shown in FIG. 1 and described herein).

At an operation 504, a first set of stimuli is generated that is provided to a loop sensor. The first set includes individual stimuli. In some embodiments, operation 504 is performed by a power source the same as or similar to power source 15 (shown in FIG. 1 and described herein).

At an operation 506, output signals are generated conveying electrical characteristics of the conductive element. The output signals may be generated responsive to provision of the first set of stimuli. In some embodiments, operation 506 is performed by a loop sensor the same as or similar to loop sensor 12 (shown in FIG. 1 and described herein).

At an operation 508, impedances of the conductive element are determined from the output signals produced responsive to the first set of stimuli, during the individual stimuli. In some embodiments, operation 508 is performed by an impedance component the same as or similar to impedance component 21 (shown in FIG. 1 and described herein).

At an operation 510, model inductances and model resistances are determined from the impedances for a model of the loop sensor for the individual stimuli of the first set, and considered a baseline for future determinations of model inductances and model resistances. In some embodiments, operation 510 is performed by an analysis component the same as or similar to analysis component 22 (shown in FIG. 1 and described herein).

At an operation 512, a second set of stimuli is generated that is provided to the loop sensor. The second set includes individual stimuli. In some embodiments, operation 512 is performed by a power source the same as or similar to power source 15 (shown in FIG. 1 and described herein).

At an operation 514, output signals are generated conveying electrical characteristics of the conductive element. The output signals may be generated responsive to provision of the second set of stimuli. In some embodiments, operation 514 is performed by a loop sensor the same as or similar to loop sensor 12 (shown in FIG. 1 and described herein).

At an operation 516, impedances of the conductive element are determined from the output signals produced responsive to the second set of stimuli, during the individual stimuli. In some embodiments, operation 516 is performed by an impedance component the same as or similar to impedance component 21 (shown in FIG. 1 and described herein).

At an operation 518, model inductances and model resistances are determined from the impedances for a model of the loop sensor for the individual stimuli of the second set. In some embodiments, operation 518 is performed by an analysis component the same as or similar to analysis component 22 (shown in FIG. 1 and described herein).

At an operation 520, whether a vehicle is proximate to the loop sensor is detected based on any of the determined model inductances and the determined model resistances. In some embodiments, detection may be based on comparisons of model inductances and/or model resistances related to the first set and second set of stimuli. In some embodiments, operation 520 is performed by a detection component the same as or similar to detection component 23 (shown in FIG. 1 and described herein).

At an operation 522, whether the loop sensor has deteriorated is assessed based on any of the determined model inductances and the determined model resistances. In some embodiments, assessment may be based on comparisons of model inductances and/or model resistances related to the first set and second set of stimuli. In some embodiments, operation 522 is performed by an assessment component the same as or similar to assessment component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A vehicle detection system configured for vehicle detection and assessing loop deterioration, the system comprising:
 a power source configured to generate a set of stimuli that are provided in turn to a loop sensor, wherein the set includes individual stimuli, wherein the set includes a first stimulus having a first frequency, a second stimulus having a second frequency, and a third stimulus having a third frequency, wherein the first, second, and third frequencies are different from each other;
 the loop sensor including a conductive element arranged in a loop, the loop sensor being configured to generate output signals conveying changes in inductance of the conductive element responsive to provision of the individual stimuli;
 an impedance component configured to determine, from the output signals produced responsive to the set of stimuli, impedances of the conductive element during the individual stimuli, wherein the impedance component is configured to determine:
  a first impedance responsive to provision of the first stimulus,
  a second impedance responsive to provision of the second stimulus,
  a third impedance responsive to provision of the third stimulus;
 an analysis component configured to determine, from the impedances, model inductances and model resistances for a model of the loop sensor for the individual stimuli, wherein the analysis component is further configured to determine a first aggregate model inductance based on aggregation of at least two individual model inductances that correspond to individual stimuli;
 a detection component configured to detect whether a vehicle is proximate to the loop sensor based on one or more of the first aggregate model inductance, the determined model inductances, and the determined model resistances; and
 an assessment component configured to assess whether the loop sensor has deteriorated based on one or more of the first aggregate model inductance, the determined model inductances, and the determined model resistances.

2. The system of claim 1, wherein the power source includes a current source, wherein the power source is configured to generate bursts of alternating current as individual stimuli having individual frequencies, and wherein the output signals produced responsive to the set of stimuli convey voltage changes.

3. The system of claim 1, wherein the model inductances include individual model inductances that correspond to individual stimuli such that the first stimulus corresponds to a first model inductance, the second stimulus corresponds to a second model inductance, and the third stimulus corresponds to a third model inductance.

4. The system of claim 1, wherein detection by the detection component is based on a comparison between a change in the first aggregate model inductance and an inductance threshold.

5. The system of claim 1, wherein the analysis component is further configured to determine a second aggregate model inductance based on an aggregation of more than two individual model inductances that correspond to individual stimuli of alternating currents having more than two different frequencies, and wherein the assessment component is configured to assess whether the loop sensor has deteriorated based on the second aggregate model inductance.

6. The system of claim 5, wherein assessment by the assessment component is based on a comparison between a change in the second aggregate model inductance and an inductance threshold.

7. The system of claim 1, wherein the model resistances include a parallel loss resistance and a series resistance.

8. The system of claim 7, wherein detection by the detection component is further based on a comparison between a change in the parallel loss resistance and a resistance threshold.

9. The system of claim 1, further comprising one or more physical processors configured by machine-readable instructions to:
 notify a user whether the vehicle is proximate to the loop sensor and whether the loop sensor has deteriorated.

10. The system of claim 1, wherein individual impedances correspond to individual stimuli.

11. The system of claim 1, wherein the loop sensor further includes an isolation transformer configured to protect one or more components of the system from power surges.

12. A method for vehicle detection and assessment of loop deterioration, the method comprising:
 arranging a conductive element that is included in a loop sensor in a loop;
 generating a set of stimuli that is provided to the loop sensor, wherein the set includes individual stimuli, wherein the set includes a first stimulus having a first frequency, a second stimulus having a second frequency, and a third stimulus having a third frequency, and wherein the first, second, and third frequencies are different from each other;
 generating, by the loop sensor, output signals conveying changes in inductance of the conductive element responsive to provision of the individual stimuli;
 determining, from the output signals produced responsive to the set of stimuli, impedances of the conductive element during the individual stimuli, wherein the impedances include:
  a first impedance determined responsive to provision of the first stimulus,
  a second impedance determined responsive to provision of the second stimulus,
  a third impedance determined responsive to provision of the third stimulus;
 determining, from the impedances, model inductances and model resistances for a model of the loop sensor for the individual stimuli;
 determining a first aggregate model inductance based on aggregation of at least two individual model inductances that correspond to individual stimuli;
 detecting whether a vehicle is proximate to the loop sensor based on one or more of the first aggregate model inductance, the determined model inductances, and the determined model resistances; and
 assessing whether the loop sensor has deteriorated based on the first aggregate model inductance, the determined model inductances, and the determined model resistances.

13. The method of claim 12, wherein determining the model inductances includes determining individual model inductances that correspond to individual stimuli such that the first stimulus corresponds to a first model inductance, the second stimulus corresponds to a second model inductance, and the third stimulus corresponds to a third model inductance.

14. The method of claim 12, wherein determining the model inductances includes determining a second aggregate model inductance based on an aggregation of more than two individual model inductances that correspond to individual stimuli of alternating currents having more than two different frequencies, and wherein assessing whether the loop sensor has deteriorated is based on the second aggregate model inductance.

15. The method of claim 14, wherein assessing whether the loop sensor has deteriorated is based on a comparison between a change in the second aggregate model inductance and an inductance threshold.

16. The method of claim 15, wherein the inductance threshold is selected based on whether the vehicle was detected as being proximate.

17. The method of claim 12, comprising:
  notifying a user whether the vehicle is proximate to the loop sensor and whether the loop sensor has deteriorated.

\* \* \* \* \*